3,047,502
IMPROVED LUBRICATING OIL COMPOSITIONS
Walther Retter, Leverkusen, Werner Müller, Koln, and Max Zimmerman, Leverkusen, Germany, assignors to Farbenfabriken Bayer Aktiengesellschaft, Leverkusen, Germany, a corporation of Germany
No Drawing. Original application May 16, 1956, Ser. No. 585,166, now Patent No. 2,937,208, dated May 17, 1960. Divided and this application Feb. 9, 1960, Ser. No. 13,414
Claims priority, application Germany May 18, 1955
4 Claims. (Cl. 252—48.4)

The present invention relates to sulfides of poly-halogenated phenols; more particularly it concerns metasulfides of polyhalogenated phenols, a process for producing the same and specific compositions of matter containing said metasulfides.

The metasulfides of polyhalogenated phenols of the present invention correspond to the general formula:

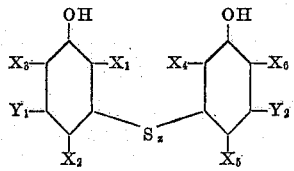

wherein $X_1$, $X_2$, $X_3$, $X_4$, $X_5$ and $X_6$ stand for halogen or an alkyl radical and $Y_1$ and $Y_2$ stand for halogen, an alkyl radical or hydrogen and in which the number of alkyl radicals at most equals the number of halogen substituents, whilst $z$ denotes 1 or 2.

These metasulfides can be obtained according to the present invention by treating polyhalogenated phenols of the general formula:

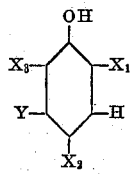

wherein $X_1$, $X_2$ and $X_3$ stand for halogen or an alkyl radical and Y stands for halogen, an alkyl radical or hydrogen and in which the number of alkyl radicals is at most the same as the number of halogen substituents, with sulfur in the presence of sulfonating acids.

Polyhalogenated phenols suitable for the performance of this process are for example 2,4,6-tri-chlorophenol, 2,4,6-tribromophenol, 2,3,4,6-tetrachloro- or tetra-bromophenol, and mixtures thereof, 2,3,4-trichloro-6-bromophenol, 2,6-dichloro-4-methyl-phenol, 2,4-dichloro-6-ethyl-phenol, 2,3,6-trichloro-4-methyl-phenol, 2,4,5-trichloro-6-methyl-phenol, 2,6-dichloro-4-fluoro-phenol and 2,6-dichloro-4-butyl-phenols.

The treatment of the polyhalogenated phenols of the aforesaid formula with sulfur in the presence of sulfonating acids may be carried out in various manners, for example by introducing the halogenated phenols and sulfur at the same time or in any succession into sulfuric acid and then heating the mixture, preferably to the temperature of the boiling water bath; it is also possible to introduce the halogenated phenols and sulfur into sulfuric acid in which sulfur trioxide is dissolved, but in this case it is advantageous to maintain a low temperature, preferably of below 20° C., since at higher temperatures the sulfur reacts with the sulfur trioxide thus failing to form the sulfide. Furthermore it is possible to use chlorosulfonic acid as sulfonating acid for the proposed treatment of halogenated phenols with sulfur.

A relatively simple method of working up is to pour the reaction mixture onto ice and water, to separate the precipitated reaction product from the acid liquor and if need be to wash it with water. For further purification, the separated reaction product may be dissolved in dilute aqueous solutions of weak alkalies and re-precipitated from the solutions filtered off, if desired, from impurities and unreacted sulfur by acidification. The sulfides of the polyhalogenated phenols are thus obtained in a practically pure state and in excellent yield.

With regard to the proportions of polyhalogenated phenols, sulfur and sulfonating acids to be used according to the invention, it is expedient to use a small excess of sulfur compared with the quantity theoretically required for the preparation of mono- or disulfides; the sulfonating acids are advantageously used in a larger excess.

The metasulfides of the present invention are valuable compounds which may serve, for instance, as disinfectants, fungicides or rubber assistants; furthermore according to the present invention they are particularly suitable as additives for lubricants and metal treatment agents. They impart to the lubricants an excellent resistance to high pressure and with metal treatment agents they reduce the wear and tear of work pieces or machine parts to a minimum without undergoing decomposition at the high stresses to which lubricants and metal treatment agents are generally subjected. It should be noted that the additives according to the present invention which carry the sulfur bridge in meta-position to the phenolic hydroxyl groups are excellently soluble in technical oils on which the lubricants and metal treatment agents are chiefly based. They distinguish themselves advantageously from corresponding compounds which carry the sulfur bridge in ortho- or para-position to the phenolic hydroxyl groups and dissolve only sparingly or not at all in technical oils.

Suitable additives are for example the following metasulfides: 3.3' - dihydroxy-2.4.5.6.2'4'5'6'-octochloro-diphenyl-disulfide, 3.3' - dihydroxy-2.4.5.6.2'4'5'6'-octobromodiphenylsulfide, 3.3'-dihydroxy-2.5.6.2'5'6'-hexachloro-4.4'-dibromo-diphenyldisulfide, 3.3'-dihydroxy-2.4.5.2'4'5' - hexachloro-6.6'-dimethyldiphenyldisulfide, 3.3'-dihydroxy - 2.5.6.2'5'6'-hexachloro-4.4'-dimethyl-diphenyldisulfide, 3.3' - dihydroxy-2.4.6.2'4'6'-hexachloro-5.5'-dimethyl-diphenyldisulfide, 3.3'-dihydroxy-2.4.6.2'4'6'-hexachlorodiphenylsulfide, 3.3' - dihydroxy-2.4.6.2'4'6'-hexabromodiphenyldisulfide, 3.3'-dihydroxy-2.4.2'4'-tetrachloro-6.6'-difluoro-diphenyldisulfide, 3.3'-dihydroxy-2.6.2'6'-tetrachloro-4.4' - dibromo - diphenyldisulfide, 3.3'-dihydroxy - 2.4.2'4'-tetrachloro-6.6'-dimethyl-diphenyldisulfide, 3.3' - dihydroxy-4.6.4'6'-tetrachloro-2.2'-diethyl-diphenyldisulfide, 3.3' - dihydroxy-2.4.2'4'-tetrachloro-6.6'-dibutyldiphenyldisulfide, 3.3-dihydroxy-2.4.2'4'-tetrabromo-6.6'-dibutyldiphenyldisulfide and the corresponding monosulfides.

Instead of adding the proposed additives alone to the lubricants or metal treatment agents it is also possible to introduce them along with other additives. Especially useful effects are obtained when using the proposed mono- or disulfides together with phosphinic acids, their acid or neutral esters or their salts with organic bases, such as are described for example in German patent specifications Nos. 851,237, 865,038, and 879,138. The phosphinic acid compounds yield with the mono- or disulfides generally clear solutions which may be admixed with the lubricants and metal treatment agents in the desired quantity, but it is also possible to introduce the mono- or disulfides and the phosphinic acid compounds into the lubricants or metal treatment agents separately in any desired order.

Instead of uniform additives it is also possible to use mixtures thereof; the same applies to other agents to be introduced together with these additives. The necessary amounts of the various additives may be ascertained in each case by preliminary experiments; in general 0.1–2% of additive referred to the lubricant or to the technical oil or fat on which the metal treatment agent is based will be sufficient.

The following examples serve to illustrate the invention without, however, limiting the scope thereof; the parts given are by weight.

*Example 1*

Into a solution of 100 parts of flowers of sulfur in 1000 parts of 30% fuming sulfuric acid there are introduced in the cold 200 parts of 2,4,6-trichlorophenol, the brown solution is after-stirred at 10–20° C. for several hours and then poured onto ice; the separated product is dissolved in excess dilute soda solution, filtered off from the undissolved sulfur and re-precipitated by pouring the solution into dilute hydrochloric acid. The crude product is separated, dried and if desired re-crystallised from glacial acetic acid or benzene.

3,3'-dihydroxy - 2,4,6-2'4'6' - hexachlorodiphenyldisulfide, M.P. 156–159° C., is thus obtained in the form of a slightly yellowish crystalline powder; yield 93%. It is very readily soluble in most organic solvents as well as in dilute soda solution.

If instead of 2,4,6-trichlorophenol a corresponding amount of 2,4,6-tribromophenol is subjected to the same sulfur reaction and working up, there is obtained after re-crystallisation from glacial acetic acid 3,3'-dihydroxy-2,4,6-2'4'6'-hexabromodiphenyldisulfide, M.P. 198–202° C., in the form of a yellowish crystalline powder in good yield.

*Example 2*

A mixture of 40 parts of sulfur flowers and 197.5 parts of 2,4,6-trichlorophenol is introduced in the cold into 600 parts of sulfuric acid monohydrate, the reaction mass is heated to 95° C. and after-stirred at 95–100° C. for 24 hours. The slowly precipitating reaction product is separated off after cooling, washed with water and treated with excess cold dilute soda solution. It is filtered off from undissolved sulfur and the filtrate poured into dilute hydrochloric acid. A yellowish brown powder separates out which is filtered off with suction and dried.

It is a mixture of various sulfurizing products which melts between 70 and 170° C. Yield 84%. By repeated recrystallisation from glacial acetic acid or benzene, the main product, 3,3'-dihydroxy-2,4,6-2'4'6-hexachloro-diphenylsulfide is obtained as a white crystalline powder of melting point 197–200° C. It is readily soluble in most organic solvents as well as in dilute soda solution.

From the mother liquors, 3,3'-dihydroxy-2,4,6-2'4'6'-hexachloro-diphenyldisulfide crystallizes out in small amounts as a pale yellowish powder of melting point 150–155° C. which is identical with the product of Example 1.

*Example 3*

Into a suspension of 64 parts of flowers of sulfur in 600 parts of chlorosulfonic acid there are introduced 197.5 parts of 2,4,6-trichlorophenol in the cold within 1 hour. The dark greenish solution formed is after-stirred at 20–25° C. for 24 hours and then poured onto ice. The separated product is dissolved in dilute soda solution until alkaline, filtered off from undissolved sulfur and the filtrate is poured into dilute sulfuric acid. The precipitated crude product is filtered off with suction and dried. Yield 90%. It is a mixture of various sulfur products which melts at a range of 60–100° C.

The mixture may be separated by treating with cyclohexane. A portion of it is barely soluble therein and yields the 3,3' - dihydroxy - 2,4,6-2'4'6' - hexachloro - diphenylsulfide of melting point 202–204° C. From the cyclohexane solution the 3,3'-dihydroxy-2,4,6-2'4'6'-hexachloro-diphenyldisulfide may be obtained.

*Example 4*

Into a solution of 37.5 parts of sulfur flowers in 375 parts of 30% fuming sulfuric acid there are introduced in the cold 57 parts of 2,3,4,6-tetrachlorophenol and the solution thus obtained is after-stirred at 10–15° C. for several hours. It is then poured onto ice and the precipitate thus formed allowed to settle, separated off from the acid liquor, dissolved in excess dilute soda solution and filtered off from sulfur. The alkaline filtrate is precipitated by pouring into dilute hydrochloric acid. The crude product is freed from unreacted 2,3,4,6-tetrachlorophenol by steam distillation, then filtered off with suction and dried. Yield: 70% referred to tetrachlorophenol used.

By re-crystallisation from benzene 3,3'-dihydroxy-2,4,5,6-2'4'5'6'-octochloro-diphenyldisulfide, M.P. 178–186° C. is obtained in the form of a yellowish white crystalline powder. It is readily soluble in most organic solvents as well as in dilute soda solution.

*Example 5*

Into a solution of 100 parts of sulfur flowers in 1000 parts of 30% fuming sulfuric acid there are introduced in the cold 211.5 parts of technical trichloro-cresol; the dark green solution is after-stirred at 15–20° C. for 4 hours. It is then poured onto ice, and the separated product is dissolved in excess dilute soda solution, filtered off from undissolved sulfur and precipitated by pouring the solution into dilute hydrochloric acid. The crude product is separated, treated with steam, dried and if desired re-crystallised from benzene. There is chiefly obtained a yellowish crystalline powder of 3,3'-dihydroxy-2,4,5-2'4'5'-hexachloro-6,6'-dimethyl-diphenyl-disulfide of melting point 168–177° C. It is readily soluble in most organic solvents as well as in dilute soda solution.

*Example 6*

To 100 parts of a spindle oil chiefly based on paraffin having a viscosity of 1.8 Engler degrees at 50° C. there is added with slight heating and stirring 1 part of 3.3'-dihydroxy-2.4.6.2'4'6'-hexachloro-diphenyldisulfide, and the mixture is stirred until a clear solution is obtained.

An oil of this kind imparts to work pieces a particular surface quality and prolongs the cutting life of the tools. It is moreover very suitable for the so-called boring, since it contributes to protect the valuable scraping cutter.

A similar result can be obtained by using instead of 3.3'-dihydroxy-2.4.6.2'4'6'-hexachloro-diphenyldisulfide a mixture containing 1 part of 3.3'-dihydroxy-2.4'4'6'-hexachloro-diphenylsulfide per about 4 parts of 3.3'-dihydroxy-2.4.6.2'4'6'-hexachloro-diphenyldisulfide.

To improve a spindle oil chiefly based on naphthenes or aromatics, an addition of 1 percent by weight of 3.3'-dihydroxy - 2.4.5.6.2'4'5'6' - octochloro -diphenyldisulfide referred to the spindle oil is particularly suitable.

*Example 7*

A mixture of equal parts of 3.3'-dihydroxy-2.4.6.2'4'6'-hexachloro-diphenyldisulfide and bis-(p-chlorophenyl-) phosphinic acid butylester is heated to about 60–80° C. and 1 part of this mixture is added to 100 parts of a slightly heated mineral oil raffinate of about 9 Engler degrees at 50° C., the raffinate being stirred until a clear solution is obtained.

In this manner a high pressure oil is obtained which is particularly suitable for the lubrication of gears and bearings under high stress.

*Example 8*

A mixture of 75 parts of bis-(p-chlorophenyl-)phosphinic acid butylester and 25 parts of the stearylamine salt of bis-(p-chlorophenyl-)phosphonic acid is heated and the mixture is stirred with 100 parts of 3.3'-dihdroxy-2.4.5.6-2'4'5'6'-octochloro-diphenyldisulfide until a homogeneous mixture is formed. This mixture of three components is then introduced with vigorous stirring into 20,000 parts of heated mineral oil raffinate of about 9 Engler degrees at 50° C. In this way, a high pressure oil is obtained having the same good properties as described in Example 7.

Instead of the disulfide used, 3.3'-dihydroxy-2.4.5-2'4'5'-hexachloro-6.6'-dimethyl-diphenyldisulfide may be reacted as well. The stearylamine salt of bis-(p-chlorophenyl-)phosphinic acid may be replaced by the stearylamine salt of bis-(p-fluorophenyl-)phosphinic acid, and the bis-(p-chlorophenyl)-phosphinic acid butyl ester by the p-chlorophenyl-phosphinic acid monobutyl ester.

*Example 9*

To 1000 parts of soda saponified fat, so-called bearing fat, there are added 5 parts of a homogeneous mixture of equal parts of 3.3'-dihydroxy-2.4.6.2'4'6'-hexachlorodiphenyldisulfide and chlorinated diphenyl having a chlorine content of about 30 percent and the mixture is then homogenized in a usual manner.

A product having high pressure properties is thus obtained which is very suitable for lubricating purposes.

*Example 10*

A homogeneous mixture is prepared from 4 parts of 3.3' - dihydroxy - 2.6.2'6' - tetrachloro - 4.4' - dibromo - diphenyl-disulfide, 4 parts of a mixture of about equal parts of bis-(p-chlorophenyl-)phosphinic acid butyl ester, p-chlorophenyl-phosphinic acid dibutyl ester and p-chlorophenyl-phosphinic acid monobutyl ester and of 2 parts of a mixture of about equal parts of bis-(p-chlorophenyl-)phosphinic acid and p-chlorophenylphosphinic acid and the whole mixture is added with stirring to 500 parts of a mineral oil raffinate of about 2 Engler degrees at 50° C. whereby stirring is continued until a clear solution is obtained. In this manner, a particularly useful cutting oil is obtained which meets also high anti-corrosive requirements.

This application is a division of application Serial No. 585,166, filed May 16, 1956, now U.S. Patent No. 2,937,208.

We claim:

1. A high pressure lubricating oil composition comprising a major amount of a mineral oil and from about 0.1 to about 2% of a metasulfide of the formula

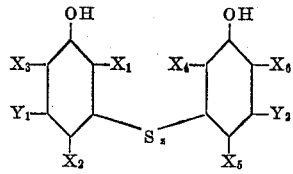

wherein $X_1$, $X_2$, $X_3$, $X_4$, $X_5$ and $X_6$ stand for a member of the group consisting of halogen and an alkyl radical, $Y_1$ and $Y_2$ stand for a member of the group consisting of halogen, an alkyl radical and hydrogen, and the number of alkyl radicals at most equals the number of halogen substituents, whereas $z$ denotes a number of the group consisting of 1 and 2.

2. A high pressure lubricating oil composition comprising a major amount of a mineral oil and from about 0.1 to about 2 percent of 3,3'-dihydroxy-2,4,6,-2'4'6'-hexachlorodiphenylsulfide.

3. A high pressure lubricating oil composition comprising a major amount of a mineral oil and from about 0.1 to about 2 percent of 3,3'-dihydroxy-2,4,6-2'4'6'-hexachlorodiphenyldisulfide.

4. A high pressure lubricating oil composition comprising a major amount of a mineral oil and from about 0.1 to about 2 percent of 3,3'-dihydroxy-2,4,5,6-2'4'5'6'-octochlorodiphenyldisulfide.

References Cited in the file of this patent
UNITED STATES PATENTS

| | | |
|---|---|---|
| 2,246,314 | Mikeska | June 17, 1941 |
| 2,937,208 | Retter et al. | May 17, 1960 |